Figure 1:
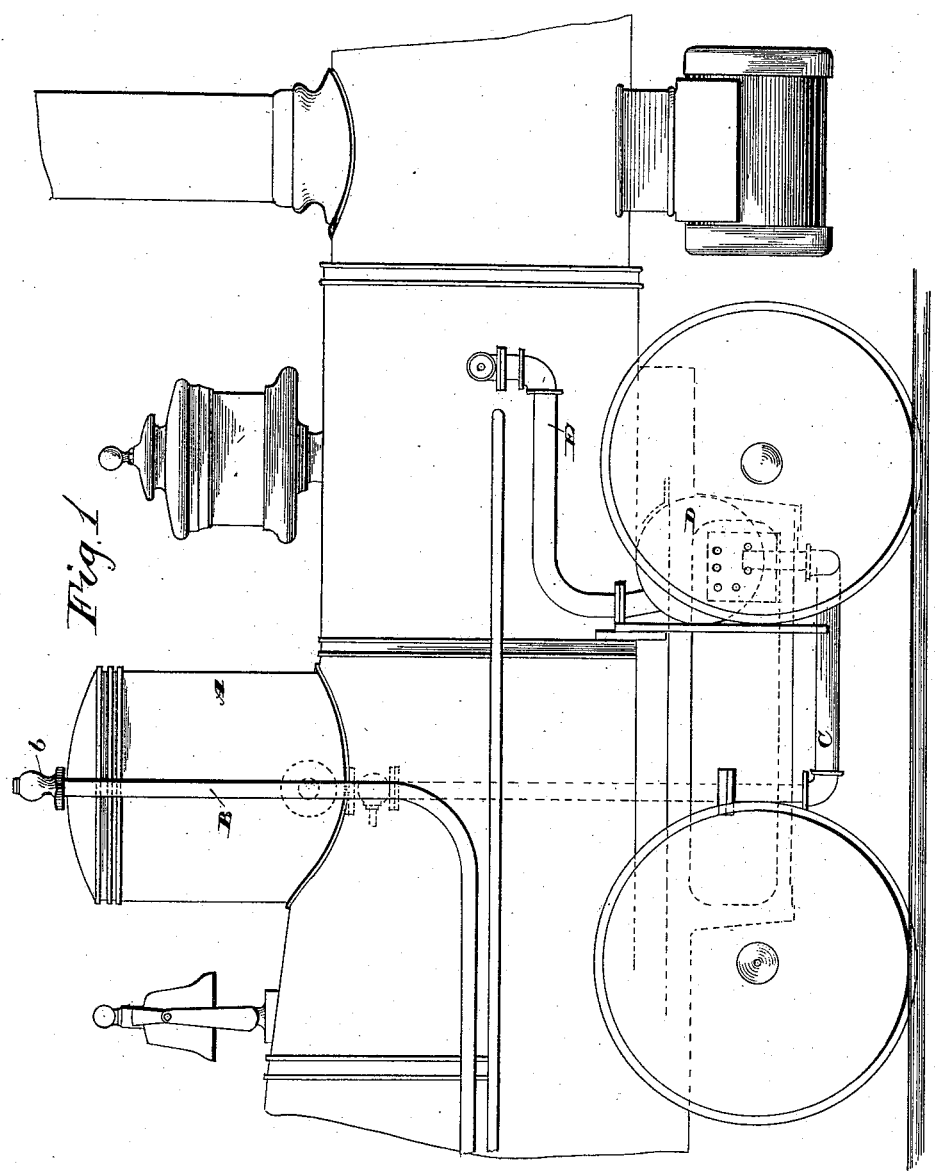

(No Model.) 3 Sheets—Sheet 1.

J. T. MEAD & J. THOMSON.
FEED WATER PURIFIER.

No. 336,249. Patented Feb. 16, 1886.

(No Model.) 3 Sheets—Sheet 2.
J. T. MEAD & J. THOMSON.
FEED WATER PURIFIER.
No. 336,249. Patented Feb. 16, 1886.
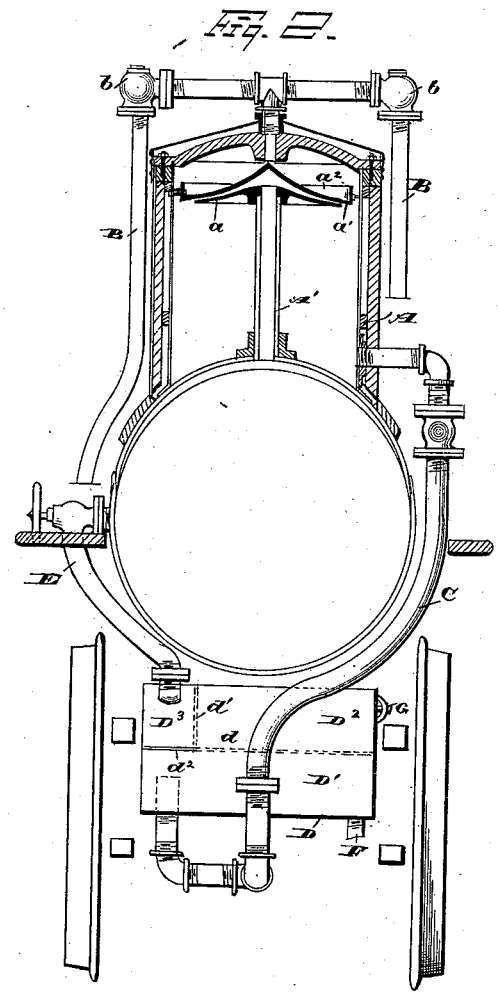
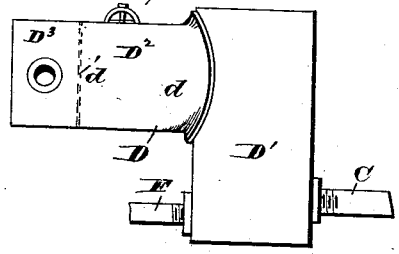
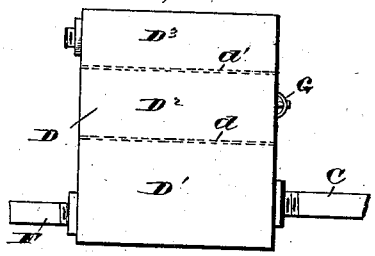
WITNESSES
INVENTORS
Attorneys (No Model.) 3 Sheets—Sheet 3.
J. T. MEAD & J. THOMSON.
FEED WATER PURIFIER.
No. 336,249. Patented Feb. 16, 1886.
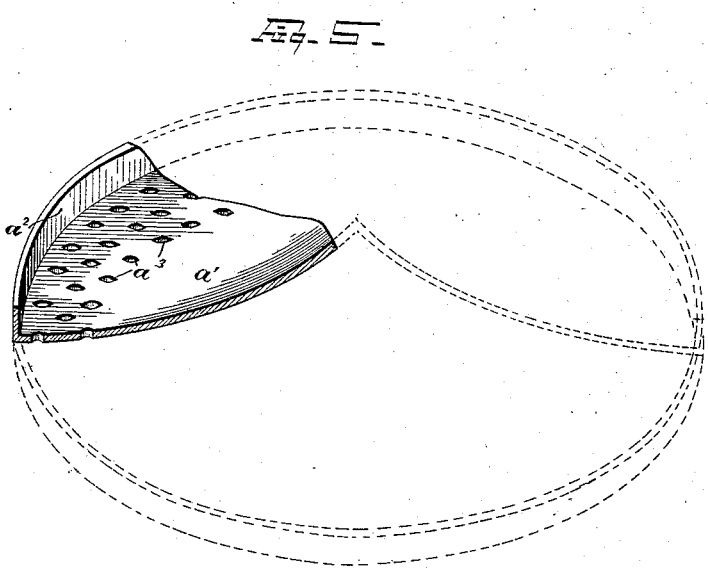

UNITED STATES PATENT OFFICE.

JOHN T. MEAD AND JOHN THOMSON, OF CLEVELAND, OHIO, ASSIGNORS TO GEORGE P. McKAY, TRUSTEE, OF SAME PLACE.

FEED-WATER PURIFIER.

SPECIFICATION forming part of Letters Patent No. 336,249, dated February 16, 1886.

Application filed October 27, 1885. Serial No. 181,077. (No model.)

*To all whom it may concern:*

Be it known that we, JOHN T. MEAD and JOHN THOMSON, of Cleveland, in the county of Cuyahoga and State of Ohio, have invented certain new and useful Improvements in Feed-Water Purifiers for Locomotive-Engines; and we do hereby declare the following to be a full, clear, and exact description of the invention, such as will enable others skilled in the art to which it pertains to make and use the same.

Our invention relates to feed-water purifiers for locomotive-engines; and it consists in certain features of construction and in combination of parts hereinafter described, and pointed out in the claim.

In the accompanying drawings, Figure 1 is a side elevation of a portion of a locomotive-engine, showing our improved feed-water purifier attached. Fig. 2 is an elevation in transverse section, looking forward. Figs. 3 and 4 are modifications, hereinafter described. Fig. 5 is a view in perspective of the upper conical plate of the heating-chamber.

A represents a so-called "dome," located, as shown, on top of the boiler, to which it is attached. This dome incloses a heating-chamber, and inside has a steam-pipe, $A'$, leading from the boiler and discharging between the conical plates $a$ and $a'$. These plates are thin, being made usually of sheet-copper, and are stayed in any suitable manner to the dome. The upper plate, $a'$, has an upwardly-projecting rim, $a^2$, at the periphery, and a series of perforations, $a^3$, inside of the rim. (Shown more clearly in Fig. 5.)

B are the induction feed-water pipes leading from the pumps, injectors, or whatever is employed to force the feed-water to the boiler, and are provided with check-valves $b$. These pipes unite and discharge through the top of the dome directly on the apex of the plate $a'$. The water spreads in a thin sheet on this plate and falls in a spray from the rim $a^2$, and through the perforations $a^3$, when it comes in direct contact with the live steam. The water in passing through the heater is raised to such a high temperature that the impurities are precipitated. The pipe C, leading from near the bottom of the dome A to the purifier D, is located underneath the boiler, as shown.

The container D externally is preferably in the form of a drum or cylinder, as shown in Figs. 1 and 2; but the form is not essential, and will be subject to various modifications to fit the purifier to all classes of locomotive-engines. The drum inside is divided by the screens $d$ and $d'$ and the plate $d^2$ into a sediment-chamber, D', a filtering-chamber, $D^2$, and a discharging-chamber, $D^3$. The filtering-chamber is filled with any suitable filtering material, preferably fine coke. The tube C discharges into the sediment-chamber, where the most of the impurities are deposited, and from which the sediment is blown off from time to time through the pipe F, leading from the bottom of the sediment-chamber, this pipe being provided with a suitable "blow-off" valve. (Not shown.) A pipe, E, connects with the discharging-chamber and leads to the boiler. On some engines the drum D is placed lengthwise of the boiler. In other cases the purifier is in the form shown in Fig. 3, the lateral portion being of such size that it may extend over one of the axles. In Fig. 4 the purifier is an upright cylinder. These and other modifications may be found necessary to adapt the purifier to the different forms of locomotive-engines now in use.

It will be observed that in each of the modifications shown we have the screens, the sediment-chamber, filtering-chamber, and discharging-chamber in substantially the same relative position to each other, so that they perform the same functions.

It is found by actual use that by means of the apparatus herein described the impurities in the feed-water, both vegetable and mineral, may be separated and blown off, so that substantially pure water is fed to the boiler. The advantages of thus purifying the feed-water are too well known and appreciated to need further notice. A suitable hand-hole plate, G, is provided, by removing which access is had to the filtering-chamber for removing, cleansing, or renewing the filtering material. We will also add in further explanation of the precipitation referred to that while we do not limit ourselves to any particular theory of operation we now believe it to be true that the chemical separation and condensation of the impurities present in the feed-water begin in the heater, and, perhaps, are completed therein, but that the mechanical separation takes place chiefly if not wholly in the purifier, organic matter being for the most part deposited in the chamber D' and vegetable matter being filtered out chiefly in the filtering-chamber D², so that the purified water enters the chamber D³; but as regards the theory of operation or the construction of the details referred to in the combination hereinafter claimed we do not limit ourselves to the form shown.

What we claim is—

The combination, with a locomotive-engine, of a heater located above the boiler, a steam-pipe connected with the boiler and located within and terminating near the top of the heater, a purifier located below the boiler, and pipes connecting the several parts and arranged substantially as shown, whereby the feed-water is conducted through the heater and purifier and from the latter to the boiler, substantially as set forth.

In testimony whereof we sign this specification, in the presence of two witnesses, this 20th day of October, 1885.

JOHN T. MEAD.
JOHN THOMSON.

Witnesses:
ALBERT E. LYNCH,
CHAS. H. DORER.